United States Patent
Greeff et al.

Patent Number: 6,075,973
Date of Patent: Jun. 13, 2000

[54] METHOD OF COMMUNICATIONS IN A BACKSCATTER SYSTEM, INTERROGATOR, AND BACKSCATTER COMMUNICATIONS SYSTEM

[75] Inventors: Roy Greeff, Boise; David K. Ovard, Meridian, both of Id.

[73] Assignee: Micron Technology, Inc., Boise, Id.

[21] Appl. No.: 09/080,624

[22] Filed: May 18, 1998

[51] Int. Cl.[7] .............................. H04Q 3/02; H03C 7/02; G08B 26/00

[52] U.S. Cl. ................ 455/38.2; 455/101; 455/106; 340/825.54; 340/505

[58] Field of Search .................... 455/38.2, 38.1, 455/526, 106, 127, 73, 44, 45, 203, 204; 342/44, 51, 42; 340/505, 825.54, 572.4, 572.2; 375/283

[56] References Cited

U.S. PATENT DOCUMENTS

| | | | |
|---|---|---|---|
| 4,075,632 | 2/1978 | Baldwin et al. | 343/6.8 |
| 4,360,810 | 11/1982 | Landt | 343/6.5 |
| 4,926,182 | 5/1990 | Ohta et al. | 342/44 |
| 5,617,060 | 4/1997 | Wilson et al. | 330/129 |
| 5,621,349 | 4/1997 | Kim et al. | 329/325 |
| 5,621,412 | 4/1997 | Sharpe et al. | 342/51 |
| 5,649,295 | 7/1997 | Shober et al. | 455/38.2 |
| 5,649,296 | 7/1997 | MacLellan et al. | 455/38.2 |
| 5,745,049 | 4/1998 | Akiyama et al. | 340/870.17 |
| 5,842,118 | 11/1998 | Wood, Jr. | 455/101 |
| 5,896,060 | 4/1999 | Ovard et al. | 329/304 |
| 5,914,671 | 6/1999 | Tuttle | 340/825.54 |

FOREIGN PATENT DOCUMENTS

WO 90/09707 8/1990 WIPO.

*Primary Examiner*—Dwayne D. Bost
*Assistant Examiner*—Erika A. Gary
*Attorney, Agent, or Firm*—Wells, St. John, Roberts, Gregory & Matkin, P.S.

[57] ABSTRACT

An interrogator for use in a backscatter system, the interrogator comprising an antenna configured to receive a backscatter signal; an IQ downconverter coupled to the antenna and configured to downconvert the backscatter signal to produce I and Q signals; a combiner coupled to the IQ downconverter and configured to combine the I and Q signals to produce a combined signal; and an analog to digital converter coupled to the combiner and configured to convert the combined signal to a digital signal. A method of communications in a backscatter system, the method comprising receiving a backscatter signal; downconverting the backscatter signal with an IQ downconverter to produce I and Q signals; combining the I and Q signals to produce a combined signal; and converting the combined signal to a digital signal.

46 Claims, 5 Drawing Sheets

METHOD OF COMMUNICATIONS IN A BACKSCATTER SYSTEM, INTERROGATOR, AND BACKSCATTER COMMUNICATIONS SYSTEM

TECHNICAL FIELD

The invention relates to wireless communication systems. More particularly, the invention relates to backscatter communication systems.

BACKGROUND OF THE INVENTION

Backscatter communication systems are known in the art. In a backscatter system, one transponder, such as an interrogator, sends out a command to a remote communications device. After the interrogator transmits the command, and is expecting a response, the interrogator switches to a CW mode (continuous wave mode). In the continuous wave mode, the interrogator does not transmit any information. Instead, the interrogator just transmits radiation at a certain frequency. In other words, the signal transmitted by the interrogator is not modulated. After a remote communications device receives a command from the interrogator, the remote communications device processes the command. The remote communications device of the backscatter system modulates the continuous wave by switching between absorbing RF radiation and reflecting RF radiation. For example, the remote communications device alternately reflects or does not reflect the signal from the interrogator to send its reply. Two halves of a dipole antenna can be either shorted together or isolated from each other to modulate the continuous wave.

One example of a backscatter system is described in commonly assigned U.S. patent application Ser. No. 08/705, 043, filed Aug. 29, 1996, and incorporated herein by reference. Another example of a backscatter system is described in U.S. Pat. No. 5,649,296 to MacLellan et al. which is also incorporated herein by reference.

In backscatter systems, the reflected backscatter signal can be returned to an interrogator in any phase because the distance between the remote communications device and the interrogator is unknown. Phase is a function of distance. Therefore, an IQ downconverter (e.g., a quadrature downconverter) is included in the interrogator. In an IQ downconverter, the local signal is mixed with the reflected backscatter signal to produce an in phase signal I. The local signal is mixed with the reflected backscatter signal, after either the local signal or the reflected signal is phase shifted 90 degrees, to produce a quadrature signal Q. Depending on the phase of the reflected backscatter signal, when the reflected backscatter signal is mixed with the local signal the result may be a positive voltage, a negative voltage, or no voltage at all. When a periodic signal reaches its peak, a 90 degree phase shifted version of the same signal reaches zero. By mixing at a 90 degrees phase shift as well as mixing the reflected signal without a phase shift, a signal be found for certain somewhere on the I output or Q output, or both. An IQ downconverter is described in U.S. Pat. No. 5,617,060 to Wilson et al., which is incorporated herein by reference.

Circuitry is typically coupled to each of the I and Q signals for various processing steps before the resultant signals are combined into one channel. This can involve duplication of circuitry.

One application for backscatter communications is in wireless electronic identification systems, such as those including radio frequency identification devices. Of course, other applications for backscatter communications exist as well. Most presently available radio frequency identification devices utilize a magnetic coupling system. An identification device is usually provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large, board level, active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of something that may not be in close proximity to an interrogator, such as a railway car.

SUMMARY OF THE INVENTION

The invention provides an interrogator for use in a backscatter system. The interrogator includes an antenna configured to receive a backscatter signal. An IQ downconverter is coupled to the antenna and configured to downconvert the backscatter signal to produce I and Q signals. A combiner is coupled to the IQ downconverter and configured to combine the I and Q signals to produce a combined signal. An analog to digital converter is coupled to the combiner and configured is to convert the combined signal to a digital signal.

In one aspect of the invention, the combiner is an analog combiner. In another aspect of the invention, the combiner is coupled directly to the IQ downconverter.

Another aspect of the invention provides a system including a wireless communications device. The wireless communications device includes an integrated circuit having a processor. The integrated circuit further includes a memory, a receiver, and a backscatter modulator coupled to the processor. The system further includes an interrogator configured to transmit a command to the wireless communications device and subsequently transmit a continuous wave to the wireless communications device for modulation by the backscatter modulator. The interrogator includes an IQ downconverter configured to receive a modulated backscatter signal from the wireless communications device and to produce I and Q signals. The interrogator further includes a combiner coupled to the downconverter and configured to produce a combined signal.

In one aspect of the invention, the combiner is coupled directly to the downconverter.

Another aspect of the invention provides a method of communications in a backscatter system. The method comprises receiving a backscatter signal. The backscatter signal is downconverted with an IQ downconverter to produce I and Q signals. The I and Q signals are combined to produce a combined signal. The combined signal is converted to a digital signal.

Circuitry coupled to the I signal was duplicated for the Q signal in prior designs. By combining the I and Q signals earlier than in other designs, duplication of circuitry is reduced.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
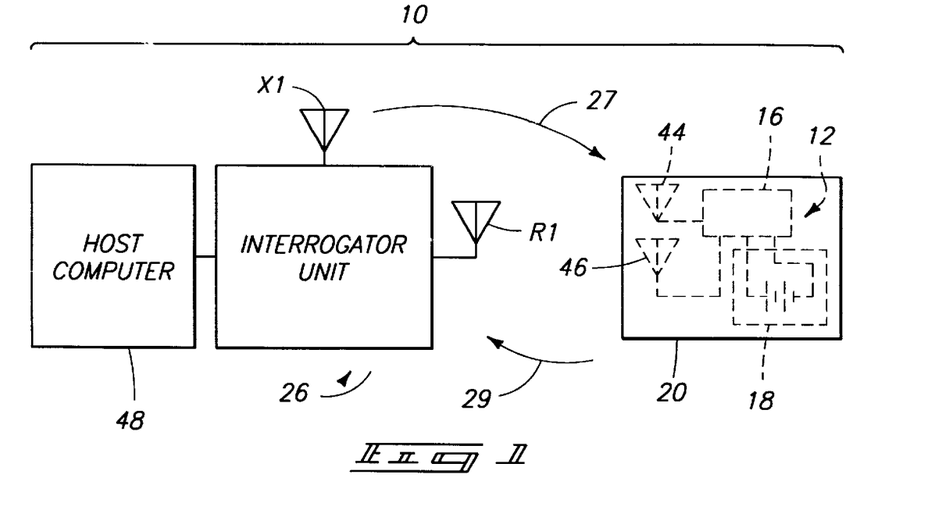
FIG. 1 is a block diagram illustrating a communication system embodying the invention.

FIG. 1 illustrates a wireless communications system 10 embodying the invention. The communications system 10 includes a first transponder including an interrogator 26 and a host computer 48 in communication with the interrogator 26. The communications system 10 further includes a wireless communications device 12, such as the device disclosed in U.S. patent application Ser. No. 08/705,043, filed Aug. 29, 1996. In one embodiment, the wireless communications device 12 comprises a wireless identification device such as the Microstamp™ integrated circuit available from Micron Communications, Inc., 3176 S. Denver Way, Boise, Id. 83705. The interrogator 26 communicates with the communications device 12 via an electromagnetic link, such as via an RF link (e.g., at microwave frequencies, in one embodiment). While other embodiments are possible, in the illustrated embodiment, the communications device 12 includes a transponder 16 having a receiver 30 and a transmitter 32. The communications device 12 further includes a power source 18 connected to the transponder 16 to supply power to the transponder 16. The communications device 12 further includes at least one antenna connected to the transponder 16 for wireless transmission and reception. In the illustrated embodiment, the communications device 12 includes at least one antenna 46 connected to the transponder 16 for radio frequency transmission by the transponder 16, and at least one receive antenna 44 connected to the transponder 16 for radio frequency reception by the transponder 16. In the illustrated embodiment, the transmit antenna 46 is a dipole antenna, and the receive antenna 44 is a loop antenna. In the illustrated embodiment, the transponder 16 is in the form of an integrated circuit. However, in alternative embodiments, all of the circuitry of the transponder 16 is not necessarily all included in a single integrated circuit.

The power source 18 is a thin film battery in the illustrated embodiment; however, in alternative embodiments, other forms of power sources can be employed. If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

The communications device 12 can be included in any appropriate housing or packaging.

Figure 2:
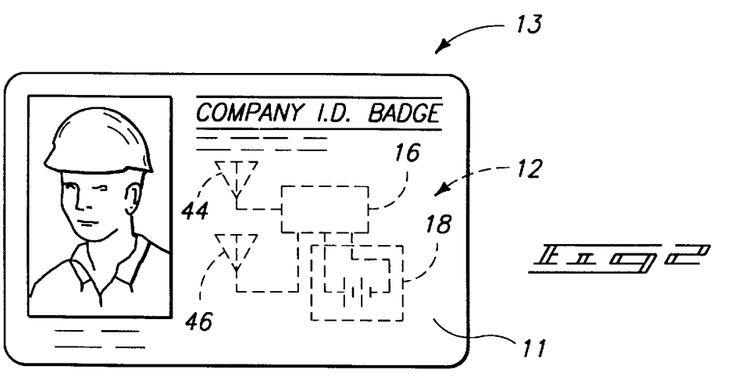
FIG. 2 is a front view of an employee badge according to one embodiment the invention.

FIG. 2 shows but one example of a housing in the form of a card 11 comprising plastic or other suitable material. The plastic card 11 houses the communications device 12 to define an employee identification badge 13 including the communications device 12. In one embodiment, the front face of the badge 13 has visual identification features such as an employee photograph or a fingerprint in addition to identifying text.

Figure 3:
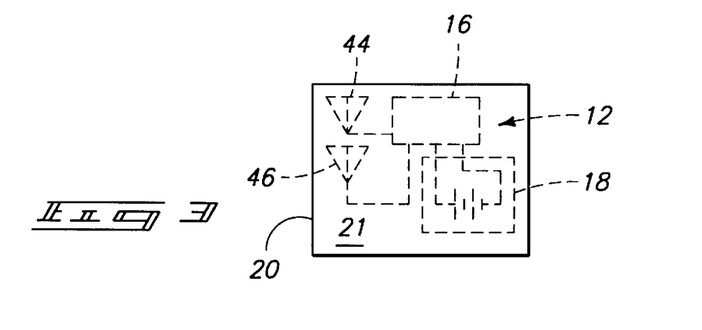
FIG. 3 is a front view of a radio frequency identification tag according to another embodiment of the invention.

FIG. 3 illustrates but one alternative housing supporting the device 12. More particularly, FIG. 3 illustrates a miniature housing 20 encasing the device 12 to define a tag which can be supported by an object (e.g., hung from an object, affixed to an object, etc.).

Although two particular types of housings have been disclosed, the communications device 12 can be included in any appropriate housing. The communications device 12 is of a small size that lends itself to applications employing small housings, such as cards, miniature tags, etc. Larger housings can also be employed. The communications device 12, housed in any appropriate housing, can be supported from or attached to an object in any desired manner.

The interrogator unit 26 includes a plurality of antennas, as well as transmitting and receiving circuitry, similar to that implemented in the device 16. The host computer 48 acts as a master in a master-slave relationship with the interrogator 26. The host computer 48 includes an applications program for controlling the interrogator 26 and interpreting responses, and a library of radio frequency identification device applications or functions. Most of the functions communicate with the interrogator 26. These functions effect radio frequency communication between the interrogator 26 and the communications device 12.

The communications system 10 includes a transmit antenna X1, and a receive antenna R1 connected to the interrogator 26. In operation, the interrogator 26 transmits an interrogation signal or command 27 ("forward link") via the antenna X1. The communications device 12 receives the incoming interrogation signal via its antenna 44. Upon receiving the signal 27, the communications device 12 responds by generating and transmitting a responsive signal or reply 29 ("return link"). The interrogator 26 is described in greater detail below.

In one embodiment, the responsive signal 29 is encoded with information that uniquely identifies, or labels the particular device 12 that is transmitting, so as to identify any object or person with which the communications device 12 is associated.

In the embodiment illustrated in FIG. 1, multiple communications devices 12 can be employed; however, there is no communication between multiple devices 12. Instead, the multiple communications devices 12 communicate with the interrogator 26. FIG. 1 illustrates the communications device 12 as being in the housing 20 of FIG. 3. The system would operate in a similar manner if the device 12 is provided in a housing such as the housing 10 of FIG. 2, or any other appropriate housing. Multiple communications devices 12 can be used in the same field of an interrogator 26 (i.e., within communications range of an interrogator 26). Similarly, multiple interrogators 26 can be in proximity to one or more of the devices 12.

The above described system 10 is advantageous over prior art devices that utilize magnetic field effect systems because, with the system 10, a greater range can be achieved, and more information can be obtained (instead of just an identification number).

As a result, such a system 10 can be used, for example, to monitor large warehouse inventories having many unique products needing individual discrimination to determine the presence of particular items within a large lot of tagged products.

Figure 4:
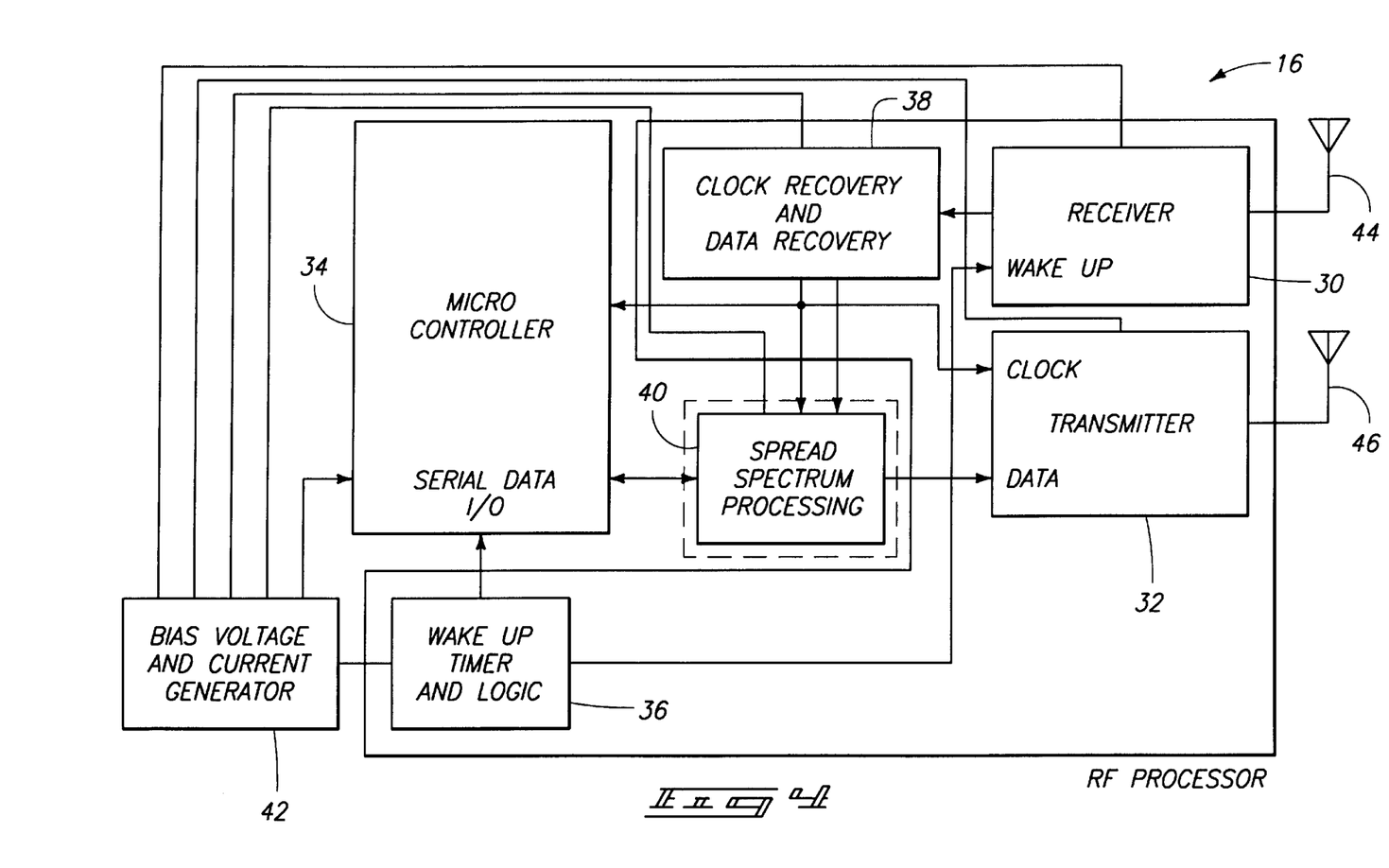
FIG. 4 is a circuit schematic of a transponder included in the system of FIG. 1.

FIG. 4 is a high level circuit schematic of the transponder 16 utilized in the devices of FIGS. 1–3. In the embodiment shown in FIG. 4, the transponder 16 is a monolithic integrated circuit. More particularly, in the illustrated embodiment, the integrated circuit 16 comprises a single die, having a size of 209×116 mils$^2$, including the receiver 30, the transmitter 32, a micro controller or microprocessor 34, a wake up timer and logic circuit 36, a clock recovery and data recovery circuit 38, and a bias voltage and current generator 42.

In one embodiment, the communications devices 12 switch between a "sleep" mode of operation, and higher power modes to conserve energy and extend battery life during periods of time where no interrogation signal 27 is received by the device 12, using the wake up timer and logic circuitry 36.

In one embodiment, a spread spectrum processing circuit 40 is included in the transponder 16. In this embodiment, signals transmitted and received by the interrogator 26, and transmitted and received by the communications device 12 are modulated spread spectrum signals. Other embodiments are possible.

Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users, as is the case with the instant radio frequency identification system 24. The spread spectrum modulation technique of the illustrated embodiment is advantageous because the interrogator signal can be distinguished from other signals (e.g., radar, microwave ovens, etc.) operating at the same frequency. The spread spectrum signals transmitted by the communications device 12 and by the interrogator 26 are pseudo random and have noise-like properties when compared with the digital command or reply. The spreading waveform is controlled by a pseudo-noise or pseudo random number (PN) sequence or code. The PN code is a binary sequence that appears random but can be reproduced in a predetermined manner by the device 12. More particularly, incoming spread spectrum signals are demodulated by the communications device 12 or by the interrogator 26 through cross correlation with a version of the pseudo random carrier that is generated by the communications device 12 itself or the interrogator 26 itself, respectfully. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is amplitude modulated. Assuming that code synchronization has been achieved at the receiver, the received signal passes through a wideband filter and is multiplied by a local replica of the PN code sequence. This multiplication yields the unspread signal.

A pseudo-noise sequence is usually an odd number of chips long. In the illustrated embodiment, one bit of data is represented by a thirty-one chip sequence. A zero bit of data is represented by inverting the pseudo-noise sequence.

Spread spectrum techniques are also disclosed in "Spread Spectrum Systems," by R. C. Dixon, published by John Wiley and Sons, Inc.

In operation, the interrogator sends out a command that is spread around a certain center frequency (e.g, 2.44 GHz). After the interrogator transmits the command, and is expecting a response, the interrogator switches to a CW mode (continuous wave mode). In the continuous wave mode, the interrogator does not transmit any information. Instead, the interrogator just transmits 2.44 GHz radiation. In other words, the signal transmitted by the interrogator is not modulated. After the communications device 12 receives the command from the interrogator, the communications device 12 processes the command. If the communications device 12 is in a backscatter mode it alternately reflects or does not reflect the signal from the interrogator to send its reply. For example, in the illustrated embodiment, two halves of a dipole antenna are either shorted together or isolated from each other to send a reply.

When the interrogator sends a command to a communications device 12, it can be important whether the command was performed by the communications device 12 and whether the interrogator knows that the command was performed. Therefore, it may be desirable to have more margin on the return link than on the forward link so that if the interrogator sends a command to a communications device 12, the interrogator can be reasonably sure to get a reply. Otherwise, if the communications device 12 is on the fringe of the communications range, it may have received a command from the interrogator to change its mode of operation without the interrogator being able to receive an acknowledgment back from the communications device 12. There may also be scenarios where it is desirable to have more margin on the forward link than the return link. Thus, in the illustrated embodiment, the power level for the forward link can be set independently from the power level for the return link, as will be described below in greater detail.

In one embodiment, the clock for the entire integrated circuit 16 is extracted from the incoming message itself by clock recovery and data recovery circuitry 38. This clock is recovered from the incoming message, and used for timing for the micro controller 34 and all the other clock circuitry on the chip, and also for deriving the transmitter carrier or the subcarrier, depending on whether the transmitter is operating in active mode or backscatter mode.

In addition to recovering a clock, the clock recovery and data recovery circuit 38 also performs data recovery on valid incoming signals. The valid spread spectrum incoming signal is passed through the spread spectrum processing circuit 40, and the spread spectrum processing circuit 40 extracts the actual ones and zeros of data from the incoming signal. More particularly, the spread spectrum processing circuit 40 takes the chips from the spread spectrum signal, and reduces each thirty-one chip section down to a bit of one or zero, which is passed to the micro controller 34.

The micro controller 34 includes a serial processor, or I/O facility that received the bits from the spread spectrum processing circuit 40. The micro controller 34 performs further error correction. More particularly, a modified hamming code is employed, where each eight bits of data is accompanied by five check bits used by the micro controller 34 for error correction. The micro controller 34 further includes a memory, and after performing the data correction, the micro controller 34 stores bytes of the data bits in memory. These bytes contain a command sent by the interrogator 26. The micro controller 34 responds to the command.

For example, the interrogator 26 may send a command requesting that any communications device 12 in the field respond with the device's identification number. Status information is also returned to the interrogator 26 from the communications device 12 when the communications device 12 responds.

The transmitted replies have a format similar to the format of incoming messages. More particularly, a reply starts with a preamble (e.g., all zeros in active mode, or alternating double zeros and double ones in backscatter mode), followed by a Barker or start code, followed by actual data.

The incoming message and outgoing reply preferably also include a check sum or redundancy code so that the integrated circuit 16 or the interrogator 12 can confirm receipt of the entire message or reply.

The interrogator 26 provides a communication link between a host computer and the transponder 16. The interrogator 26 connects to the host computer 48 via an IEEE-1284 enhanced parallel port (EPP). The interrogator communicates with the transponder 16 via the RF antennas X1, and R1.

A Maximal Length Pseudo Noise (PN) Sequence is used in the Direct Sequence Spread Spectrum (DSSS) communications scheme in the forward link. In one embodiment, the sequence is generated by a linear feedback shift register. This produces a repeating multiple "chip" sequence.

A zero bit is transmitted as one inverted full cycle of the PN sequence. A one bit is transmitted as one full non-inverted cycle of the PN sequence.

After sending a command, the interrogator sends a continuous unmodulated RF signal with a frequency of 2.44175 GHz. Return link data is Differential Phase Shift Key (DPSK) modulated onto a square wave subcarrier with a frequency of 596.1 KHz. A data 0 corresponds to one phase and data 1 corresponds to another, shifted 180 degrees from the first phase. The subcarrier is used to modulate antenna impedance of a transponder 16. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator. In one embodiment, the dipole antenna is a printed microstrip half wavelength dipole antenna.

Figure 5:
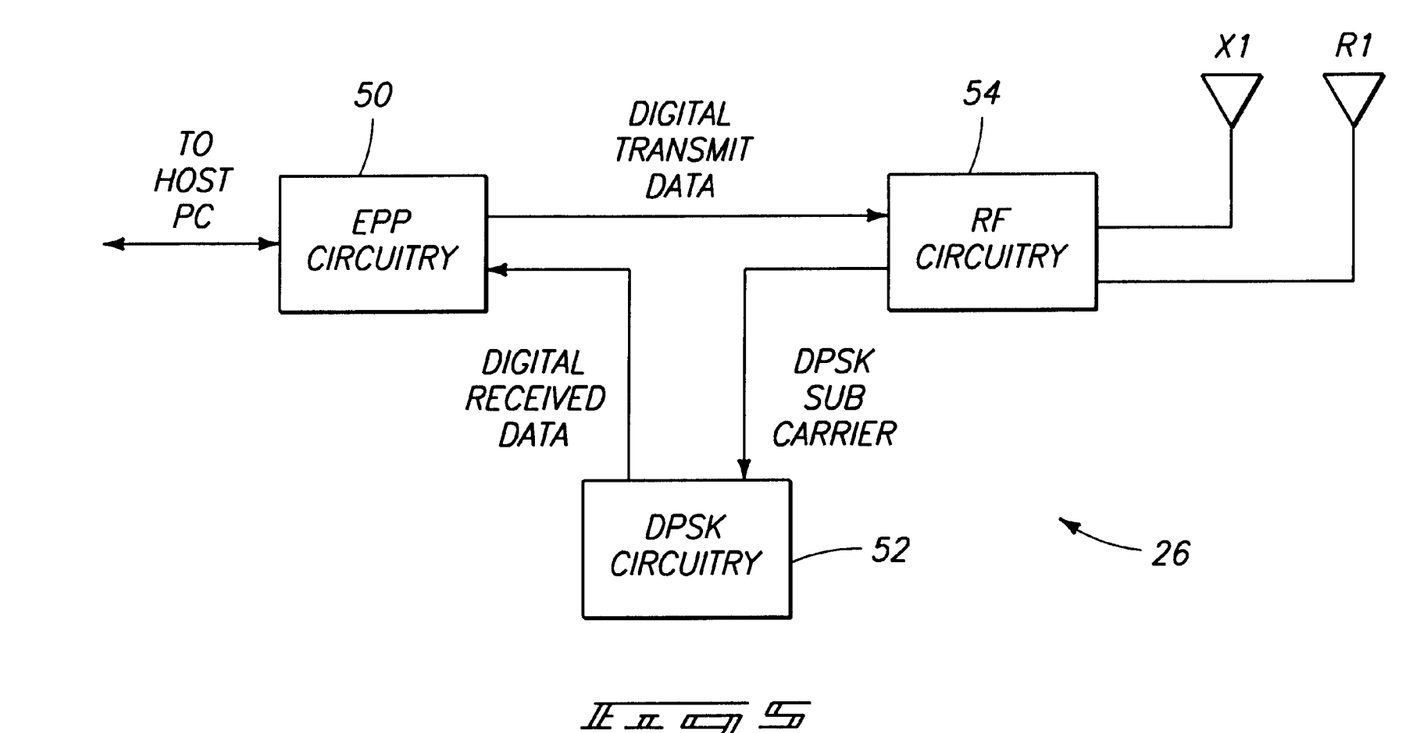
FIG. 5 is a block diagram of an interrogator in accordance with one embodiment of the invention.

In one embodiment (see FIG. 5), the interrogator 26 includes enhanced parallel port (EPP) circuitry 50, DPSK (differential phase shift keyed) circuitry 52, and RF (radio frequency) circuitry 54, as well as a power supply (not shown) and a housing or chassis (not shown). In the illustrated embodiment, the enhanced parallel port circuitry 50, the DPSK circuitry 52, and the RF circuitry 54 respectively define circuit card assemblies (CCAs). The interrogator uses an IEEE-1284 compatible port in EPP mode to communicate with the host computer 48. The EPP circuitry 50 provides digital logic required to coordinate sending and receiving a message with a transponder 16. The EPP circuitry 50 buffers data to transmit from the host computer 48, converts the data to serial data, and encodes it. The EPP circuitry 50 then waits for data from the transponder 16, converts it to parallel, and transfers it to the host computer 48. In one embodiment, messages include up to 64 bytes of data.

The EPP mode interface provides an asynchronous, interlocked, byte wide, bidirectional channel controlled by a host device. The EPP mode allows the host computer to transfer, at high speed, a data byte to/from the interrogator within a single host computer CPU I/O cycle (typically 0.5 microseconds per byte).

Figure 6:
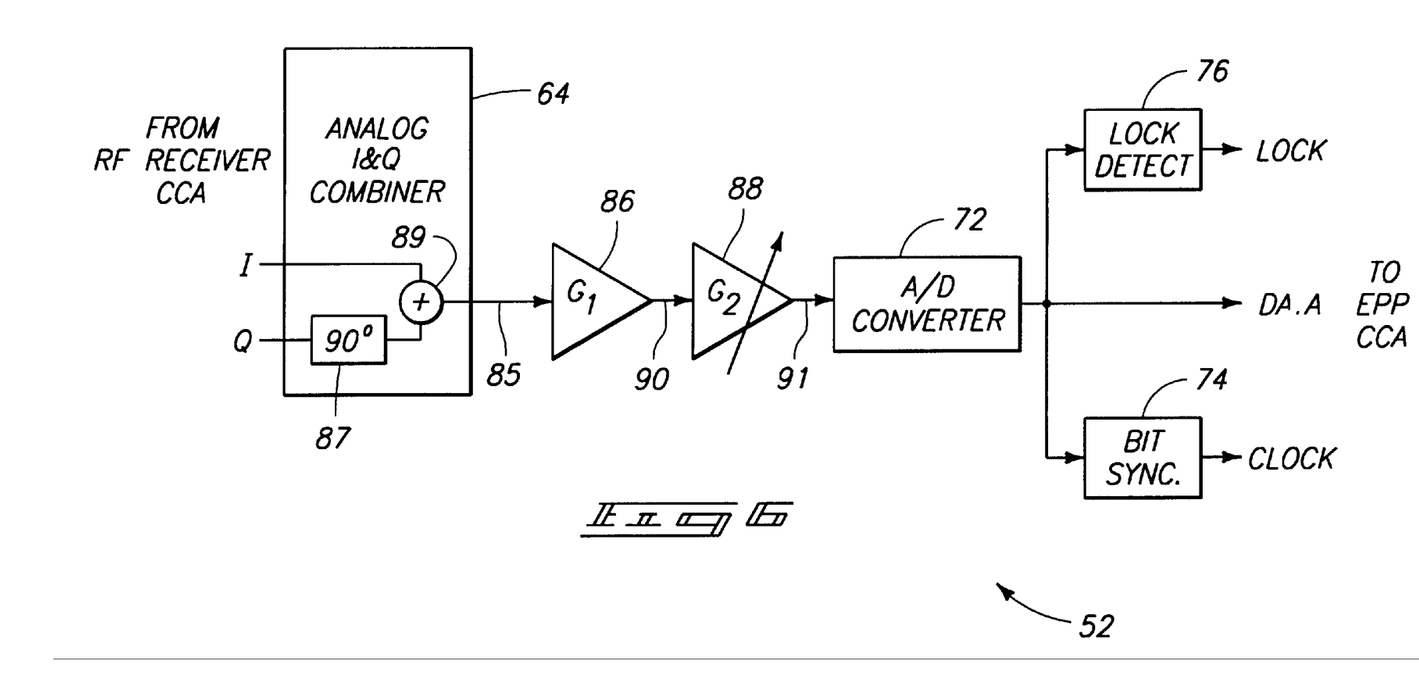
FIG. 6 is a circuit schematic of DPSK circuitry included in the interrogator of FIG. 5.
Figure 7:
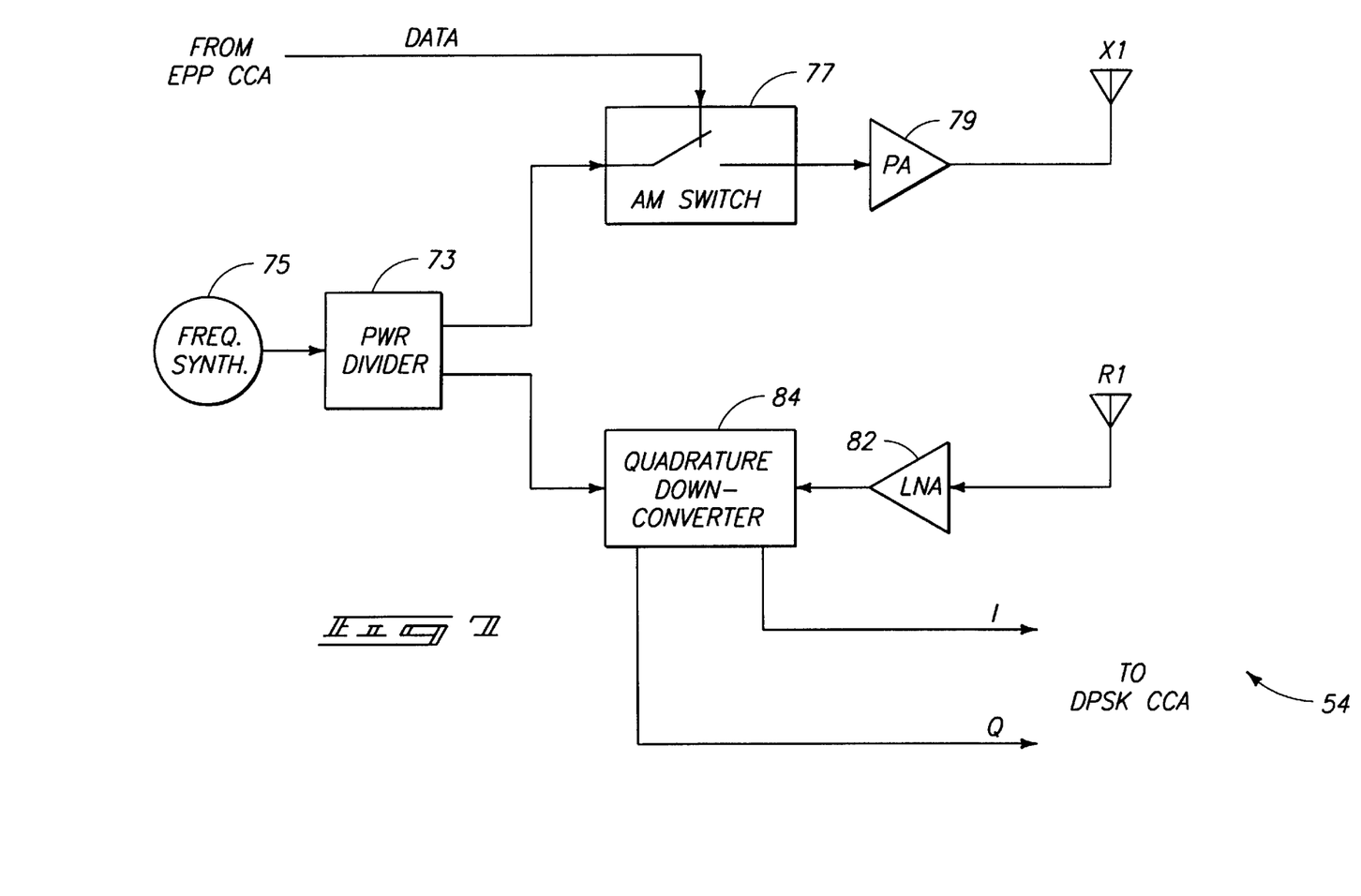
FIG. 7 is a circuit schematic of RF circuitry included in the interrogator of FIG. 5.

The DPSK circuitry 52 (see FIG. 6) receives signals I and Q from the RF circuitry 54 (described below), which signals contain the DPSK modulated sub-carrier. The DPSK circuitry 52 includes a combiner 64, coupled to the I and Q signals, combining the analog signals to produce a combined signal 85. The combiner 64 includes a phase shifter 87 configured to shift one of the signals I and Q by 90 degrees before the signals are combined in an adder 89. The combiner 64 is an analog quadrature combiner. In the illustrated embodiment, the combiner 64 is coupled directly to a quadrature downconverter 84 (FIG. 7).

The DPSK circuitry 52 further includes an amplifier 86 coupled to the combiner 64 and configured to amplify the combined signal 85 to produce an amplified signal 90. The DPSK circuitry 52 further includes automatic gain control circuitry 88 coupled to the amplifier 86 and configured to amplify the amplified signal 90 to produce a twice amplified signal 91. In the illustrated embodiment, the automatic gain control circuitry 88 comprises a voltage controlled amplifier.

The DPSK circuitry 52 further includes an analog to digital converter 72 coupled to the automatic gain control circuitry 88 and configured to convert the combined signal to a digital signal.

The DPSK circuitry 52 further includes an analog to digital converter 72 coupled to the automatic gain control circuitry 88 to convert the signal 91 from an analog signal to a digital signal. The DPSK circuitry 52 further includes a bit synchronizer 74 coupled to the analog to digital converter 72 for regeneration of the data clock. The DPSK circuitry 52 further includes lock detect circuitry 76 coupled to the analog to digital converter 72 and generating a lock detect signal. The data, clock, and lock detect signal are sent to the EPP circuitry 50.

The RF circuitry 54 (see FIG. 7) interfaces with the transmit and receive antennas X1, and R1. The RF circuitry modulates the data for transmission to a transponder 16, provides a continuous wave (CW) carrier for backscatter communications with a transponder 16 (if backscatter communications are employed), and receives and downconverts the signal received from the transponder unit (which is a backscatter signal in one embodiment).

The RF circuitry 54 also includes a power divider 73, and a frequency synthesizer 75 coupled to the power divider 73. The frequency synthesizer 75 tunes the RF continuous waver carrier. The RF circuitry defines a transmitter, and receives data from the EPP circuitry 50. The RF circuitry 54 includes an amplitude modulation (AM) switch 77 that receives the data from the EPP circuitry 50 and amplitude modulates the data onto a carrier. More particularly, the AM switch 77 turns the RF on and off (ON OFF KEY). The RF circuitry 54 further includes a power amplifier 79, coupled to the AM switch 77, which amplifies the signal.

During continuous wave (CW) transmission for the backscatter mode, the AM switch 74 is left in a closed position. When the interrogator 26 is transmitting in the CW mode, the transponder 16 backscatters the signal with a DPSK modulated sub carrier. This signal is received via the receive antenna R1. The RF circuitry 54 further includes a low noise amplifier (LNA) 82 coupled to the antenna RI and amplifying the received signal. The RF circuitry 54 further includes a quadrature downconverter 84, coupled to the LNA 82, coherently downconverting the received signal. The quadrature downconverter mixes the received signal with a locally generated signal from the frequency synthesizer 75 and a 90 degree phase shifted signal to produce baseband signals I and Q (in-phase and quadrature signals). The I and Q signals, which contain the DPSK modulated sub-carrier, are passed on to the DPSK circuitry 52 (FIG. 6) for demodulation.

An example of a command that can be sent from the interrogator 26 to the communications device 12 is an Identify command.

An Identify command is used when attempting to determine the identification of one or more of the devices 12. Each communications device 12 has its own identification number "TagId." It is possible that the interrogator will receive a garbled reply if more than one tag responds with a reply. If replies from multiple tags are received, an arbitration scheme is used to isolate a single communications device 12.

A WriteDigitalPort command is used to write data to the synchronous serial port of a communications device 12.

A WriteTagId command is used to update the TagId of a communications device 12.

An IdentifyAll command returns the number of communications devices 12 found within the system's communication range.

Thus, an interrogator has been provided including a combiner coupled to a quadrature downconverter. By combining the I and Q signals in an interrogator earlier than in other designs, duplication of circuitry is reduced.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A backscatter system interrogator comprising:

an antenna configured to receive a backscatter signal;

an IQ downconverter coupled to the antenna and configured to downconvert the backscatter signal to produce I and Q signals;

a combiner coupled to the IQ downconverter and configured to combine the I and Q signals to produce a combined signal; and an analog to digital converter coupled to the combiner and configured to convert the combined signal to a digital signal.

2. A backscatter system interrogator in accordance with claim 1 wherein the combiner is a quadrature combiner.

3. A backscatter system interrogator in accordance with claim 1 wherein the combiner is an analog combiner.

4. A backscatter system interrogator in accordance with claim 1 and further comprising an amplifier coupled between the combiner and the analog to digital converter, the amplifier being configured to amplify the combined signal.

5. A backscatter system interrogator comprising:

an antenna configured to receive a backscatter signal;

a quadrature downconverter coupled to the antenna and configured to convert the backscatter signal to produce I and Q signals;

a combiner coupled directly to the downconverter and configured to combine the I and Q signals to produce a combined signal; and automatic gain control circuitry coupled to the combiner and configured to amplify the combined signal.

6. A backscatter system interrogator in accordance with claim 5 wherein the combiner is an analog quadrature combiner.

7. A backscatter system interrogator in accordance with claim 5 and further comprising an amplifier coupled to the combiner and configured to amplify the combined signal.

8. A backscatter system interrogator comprising:

an antenna configured to receive a backscatter signal;

a quadrature downconverter coupled to the antenna and configured to convert the backscatter signal to produce I and Q signals;

a combiner coupled directly to the downconverter and configured to combine the I and Q signals to produce a combined signal; and an amplifier coupled to the combiner and configured to amplify the combined signal to produce an amplified signal, and a voltage controlled amplifier coupled to the first mentioned amplifier and configured to further amplify the amplified signal.

9. A backscatter system interrogator comprising:

an antenna configured to receive a backscatter signal;

an IQ downconverter coupled to the antenna and configured to produce I and Q signals;

a combiner coupled directly to the IQ downconverter and configured to combine the I and Q signals to produce a combined signal; and an analog to digital converter configured to convert the combined signal to a digital signal.

10. A backscatter system interrogator in accordance with claim 9 and further comprising automatic gain control circuitry coupled between the combiner and the analog to digital converter.

11. A backscatter system interrogator in accordance with claim 9 wherein the combiner is a quadrature combiner.

12. A backscatter system interrogator in accordance with claim 9 and further comprising an amplifier coupled between the combiner and the analog to digital converter.

13. A backscatter system interrogator in accordance with claim 9 and further comprising an amplifier coupled to the combiner and configured to amplify the combined signal to produce an amplified signal, and a voltage controlled amplifier coupled to the first mentioned amplifier and configured to further amplify the amplified signal.

14. A system comprising:
a wireless communications device including an integrated circuit having a processor, and a memory, a receiver, and a backscatter modulator coupled to the processor; and
an interrogator configured to transmit a command to the wireless communications device and subsequently transmit a continuous wave to the wireless communications device for modulation by the backscatter modulator, the interrogator including an IQ downconverter configured to downconvert a modulated backscatter signal from the wireless communications device into I and Q signals, a combiner coupled to the IQ downconverter and configured to combine the I and Q signals to produce a combined signal, and an analog to digital converter coupled to the combiner and configured to convert the combined signal to a digital signal.

15. A system in accordance with claim 14 wherein the interrogator is configured to transmit the command at a microwave frequency.

16. A system in accordance with claim 15 wherein the interrogator is configured to transmit the continuous wave at a microwave frequency.

17. A system in accordance with claim 14 wherein the wireless communications device includes a self contained power source coupled to the integrated circuit.

18. A system comprising:
a wireless communications device including an integrated circuit having a processor, and a memory, a receiver, and a backscatter modulator coupled to the processor; and
an interrogator configured to transmit a command to the wireless communications device and subsequently transmit a continuous wave to the wireless communications device for modulation by the backscatter modulator, the interrogator including an IQ downconverter configured to receive a modulated backscatter signal from the wireless communications device and to produce I and Q signals, the interrogator further including a combiner coupled directly to the IQ downconverter and configured to produce a combined signal, and the interrogator further including an analog to digital converter coupled to the combiner and configured to convert the combined signal to a digital signal.

19. A system in accordance with claim 18 wherein the interrogator is configured to transmit an amplitude modulated signal.

20. A system comprising:
a wireless communications device including an integrated circuit having a processor, and a memory, a receiver, and a backscatter modulator coupled to the processor; and an interrogator configured to transmit a command to the wireless communications device and subsequently transmit a continuous wave to the wireless communications device for modulation by the backscatter modulator, the interrogator including an IQ downconverter configured to receive a modulated backscatter signal from the wireless communications device and to produce I and Q signals, the interrogator further including a combiner coupled directly to the IQ downconverter and configured to produce a combined signal, and the interrogator further including automatic gain control circuitry coupled to the combiner and configured to produce an amplified signal, and an analog to digital converter coupled to the automatic gain control circuitry and configured to convert the amplified signal to a digital signal.

21. A system comprising:
a wireless communications device including an integrated circuit having a processor, and a memory, a receiver, and a backscatter modulator coupled to the processor; and
an interrogator configured to transmit a command to the wireless communications device and subsequently transmit a continuous wave to the wireless communications device for modulation by the backscatter modulator, the interrogator including an IQ downconverter configured to receive a modulated backscatter signal from the wireless communications device and to produce I and Q signals, the interrogator further including a combiner coupled directly to the IQ downconverter and configured to produce a combined signal, the combiner being an analog quadrature combiner, and the interrogator further including an analog to digital converter coupled to the combiner and configured to convert the combined signal to a digital signal.

22. A system comprising:
a wireless communications device including an integrated circuit having a processor, and a memory, a receiver, and a backscatter modulator coupled to the processor; and
an interrogator configured to transmit a command to the wireless communications device and subsequently transmit a continuous wave to the wireless communications device for modulation by the backscatter modulator, the interrogator including an IQ downconverter configured to receive a modulated backscatter signal from the wireless communications device and to produce I and Q signals, the interrogator further including a combiner coupled directly to the IQ downconverter and configured to produce a combined signal, an amplifier coupled to the combiner and configured to produce an amplified signal, and an analog to digital converter coupled to the amplifier and configured to convert the amplified signal to a digital signal.

23. A system comprising:
a wireless communications device including an integrated circuit having a processor, and a memory a receiver, and a backscatter modulator coupled to the processor; and
an interrogator configured to transmit a command to the wireless communications device and subsequently transmit a continuous wave to the wireless communications device for modulation by the backscatter modulator, the interrogator including an IQ downconverter configured to receive a modulated backscatter signal from the wireless communications device and to produce I and Q signals, the interrogator further including a combiner coupled directly to the IQ downconverter and configured to produce a combined signal, an amplifier coupled to the combiner and configured to produce an amplified signal, a voltage controlled amplifier coupled to the first mentioned amplifier and configured to produce a twice amplified signal, and an analog to digital converter coupled to the amplifier and configured to convert the twice amplified signal to a digital signal.

24. A method of communications in a backscatter system, the method comprising:

receiving a backscatter signal;

downconverting the backscatter signal with an IQ downconverter to produce I and Q signals;

combining the I and Q signals to produce a combined signal;

converting the combined signal to a digital signal; and amplifying the combined signal prior to converting to a digital signal.

25. A method of communications in accordance with claim 24 wherein the I and Q signals are combined using a quadrature combiner.

26. A method of communications in accordance with claim 24 wherein the I and Q signals are combined using an analog combiner.

27. A method of communications in a backscatter system the method comprising:

receiving a backscatter signal;

downconverting the backscatter signal with an IQ downconverter to produce I and Q signals;

combining the I and Q signals to produce a combined signal;

converting the combined signal to a digital signal; and amplifying the combined signal with a voltage controlled amplifier prior to converting to a digital signal.

28. A method of communications in a backscatter system, the method comprising:

receiving a backscatter signal;

downconverting the backscatter signal with an IQ downconverter to produce I and Q signals;

combining the I and Q signals immediately after the downconverting to produce a combined signal; and performing automatic gain control on the combined signal.

29. A method of communications in accordance with claim 28 wherein the I and Q signals are combined using an analog quadrature combiner.

30. A method of communications in accordance with claim 28 and further comprising amplifying after the I and Q signals are combined.

31. A method of communications in a backscatter system, the method comprising:

receiving a backscatter signal;

downconverting the backscatter signal with an IQ downconverter to produce I and Q signals;

combining the I and Q signals immediately after the downconverting to produce a combined signal; and amplifying after the I and Q signals are combined to produce an amplified signal, and then further amplifying the amplified signal with a voltage controlled amplifier.

32. A method of communications in a backscatter system, the method comprising:

receiving a backscatter signal;

downconverting the backscatter signal with an IQ downconverter to produce I and Q signals;

combining the I and Q signals immediately after the downconverting to produce a combined signal; and converting the combined signal to a digital signal.

33. A method of communications in accordance with claim 32 and further comprising performing automatic gain control on the combined signal before converting the combined signal to a digital signal.

34. A method of communications in accordance with claim 32 wherein the I and Q signals are combined using an analog quadrature combiner before converting the combined signal to a digital signal.

35. A method of communications in accordance with claim 32 and further comprising amplifying after the I and Q signals are combined before converting the combined signal to a digital signal.

36. A method of communications in accordance with claim 32 and further comprising amplifying after the I and Q signals are combined to produce an amplified signal, and then further amplifying the amplified signal with a voltage controlled amplifier before converting the combined signal to a digital signal.

37. A method of communications in a backscatter system including an interrogator and a wireless communications device having an integrated circuit having a processor, and a memory, a receiver, and a backscatter modulator coupled to the processor, the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

as combining the I and Q signals after the downconverting to produce a combined signal; and converting the combined signal to a digital signal.

38. A method of communications in accordance with claim 37 wherein transmitting the command comprises transmitting the command at a microwave frequency.

39. A method of communications in accordance with claim 37 wherein transmitting the continuous wave comprises transmitting the continuous wave at a microwave frequency.

40. A method of communications in accordance with claim 37 and further comprising coupling a self contained power source to the integrated circuit.

41. A method of communications in a backscatter system including an interrogator and including a wireless communications device having an integrated circuit having a processor, and a memory, a receiver, and a backscatter modulator coupled to the processor, the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

combining the I and Q signals immediately after the downconverting to produce a combined signal; and converting the combined signal to digital signal.

42. A method of communications in accordance with claim 41 wherein transmitting the command comprises transmitting an amplitude modulated signal.

43. A method of communications in a backscatter system including an interrogator and including a wireless communications device having an integrated circuit having a processor, and a memory, a receiver, and a backscatter modulator coupled to the processor, the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

combining the I and Q signals immediately after the downconverting to produce a combined signal; and performing automatic gain control on the combined signal to produce an amplified signal, and converting the amplified signal to a digital signal.

44. A method of communications in a backscatter system including an interrogator and including a wireless communications device having an integrated circuit having a processor, and a memory, a receiver, and a backscatter modulator coupled to the processor, the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

combining the I and Q signals immediately after the downconverting to produce a combined signal, the combining of the I and Q signals including using an analog quadrature combiner; and converting the combined signal to a digital signal.

45. A method of communications in a backscatter system including an interrogator and including a wireless communications device having an integrated circuit having a processor, and a memory, a receiver, and a backscatter modulator coupled to the processor, the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

combining the I and Q signals immediately after the downconverting to produce a combined signal; and amplifying, after the I and Q signals are combined, to produce an amplified signal, and converting the amplified signal to a digital signal.

46. A method of communications in a backscatter system including an interrogator and including a wireless communications device having an integrated circuit having a processor, and a memory a receiver, and a backscatter modulator coupled to the processor the method comprising:

transmitting a command to the wireless communications device from the interrogator;

transmitting a continuous wave to the wireless communications device from the interrogator for modulation by the backscatter modulator, after the transmitting;

receiving with the interrogator a modulated backscatter signal from the wireless communications device;

downconverting the backscatter signal with an IQ downconverter to produce I and Q signals;

combining the I and Q signals immediately after the downconverting to produce a combined signal; and amplifying, after the I and Q signals are combined, to produce an amplified signal, further amplifying the amplified signal with a voltage controlled amplifier to produce a twice amplified signal, and converting the twice amplified signal to a digital signal.

* * * * *